March 22, 1966 M. KESSLER 3,241,182
APPARATUS FOR THE PRODUCTION OF HEAVILY
EMBOSSED, THICK PLASTIC MATS
Filed April 23, 1963

INVENTOR
Milton Kessler

BY Max L. Libman

ATTORNEY

United States Patent Office 3,241,182
Patented Mar. 22, 1966

3,241,182
APPARATUS FOR THE PRODUCTION OF HEAVILY EMBOSSED, THICK PLASTIC MATS
Milton Kessler, 4535 Grove Drive, Youngstown, Ohio
Filed Apr. 23, 1963, Ser. No. 275,133
2 Claims. (Cl. 18—12)

This invention relates to apparatus for the production of heavily embossed, thick plastic mat of any desired length.

There are available on the market plastic mats having a fairly heavily embossed surface, such as are used for rain mats in the lobbies of public buildings, on passenger ramps, automobile floor mats, etc. This type of service requires a fairly heavy mat with good wearing qualities, and usually requires a fairly deeply corrugated or embossed surface both as an anti-slip surface and for cleaning mud and dirt from the bottom of the shoes of people using the mat. Such matting is presently made by expensive calendering operations, requiring very complex and expensive machinery, with a multitude of very fine adjustments of pressure and temperature at many points along the route which the material must travel in the process of being formed. In some cases, the material is made by calendering and kneading operations requiring a series of very accurately machined large rolls, which are exceedingly expensive to manufacture, together with complex machinery for carefully adjusting the distances, pressures, temperatures, etc. With all of these complications, the depth and fineness of detail of the embossing on the suface of the matting still leaves much to be desired.

It is a major object of the present invention to produce a superior plastic mat of the above type in a very simple manner, by the use of comparatively simple and inexpensive machinery, and providing an exceedingly fine detailed embossing on the surface, of any desired design, such as a very deep textile design simulating very realistically the appearance of several layers of textile strands having the exact appearance of coarse matting.

Another object is to provide a relatively simple mechanism for the production of such plastic matting, requiring no expensive and accurately machined calendering rolls, and no external sources of heat for the processing of the matting, the necessary temperature control being achieved by proper manipulation of the hot extruded plastic as it emerges from the die.

A further object is to provide a matrix for the production of embossed surfaces on any plastic matting, said matrix consisting of a relatively soft plastic surface, preferably in the form of an endless belt, capable of producing heavily undercut impressions on the surface of the mat.

According to the invention, the plastic material is extruded in the form of a sheet of the desired width and approximately the desired thickness, onto an endless flexible belt, which is made to pass partially around and pressed against a drum carrying the matrix surface in the form of a flexible belt of relatively soft plastic material such as rubber, bearing on its surface the reverse impression of the embossing which it is desired to impart to the surface of the plastic mat. Means are provided for adjusting the pressure of the endless conveyer belt against the matrix surface, both at the initial point of contact and at the point of separation.

The specific nature of the invention, as well as other objects and advantages thereof, will clearly appear from a preferred embodiment as shown in the accompanying drawing, in which.

The production of an ornamental or useful three-dimensional embossed pattern upon sheets of thermoplastic material of various kinds such as rubber, vinylacetate, vinyl chloride, etc., while simple in principle, has proved to be difficult to accomplish satisfactorily in practice. These difficulties have been acknowledged by the prior art, and some of them are enumerated, for example, in the patents to Knowland, No. 2,446,771, and Stober, No. 2,582,294. These difficulties include fouling of the mold surface, the expense of engraving cylindrical mold shells for drums, and the difficulty of providing proper temperature conditions due to the thermal characteristics of the thermal plastic materials employed.

Figure 1:
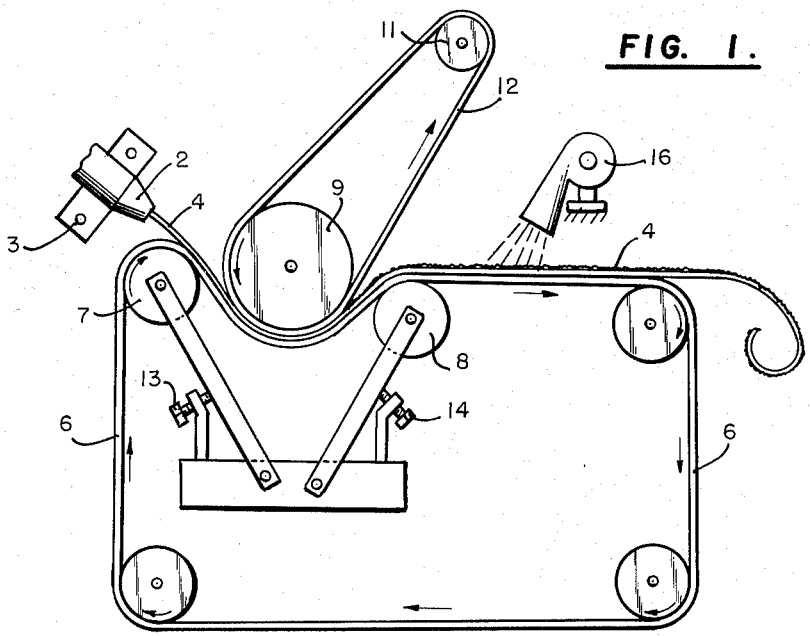
FIG. 1 is a diagrammatic side elevation of an apparatus according to the invention.
Figure 2:
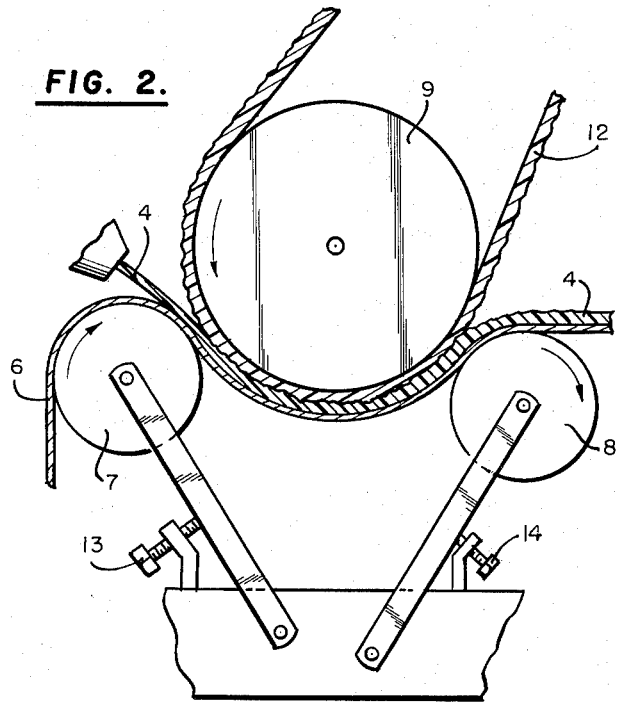
FIG. 2 is an enlarged view of a portion of the apparatus shown in FIG. 1.

Referring to FIG. 1, the plastic material is extruded from a conventional extruder, through a slot die 2 of the desired width and thickness, typically being three or four feet in width, and from ⅛ to 3/16 inch in thickness. The die is preferably heated by conventional heating means 3 in order to ensure proper control of temperature of the extruded material, any conventional heating means being suitable for this purpose, such as electric heaters distributed along the length of the slot, in order to ensure uniform temperature of the extruded material along its width as it issues from the slot. The extruded sheet 4 passes onto an endless moving belt 6, of somewhat greater width than the sheet 4 which is traveling at preferably the same rate as the extruded sheet. The belt speed may differ a little from that of the sheet 4; if it is faster, the sheet will be somewhat thinner and narrower, and if it is slower, the sheet will be heavier and wider. Belt 6 is preferably a non-elastic fabric belt of the type conventionally used in conveyers, and has no special requirements except that it be sufficiently strong for the purpose. The belt 6 is constrained by drums or rollers 7 and 8 against a substantial portion of the arcuate surface of a larger drum 9. Drums 9 and 11 carry a flexible endless belt 12, the external surface of which bears the matrix, i.e., the reverse of the designed embossed surface, and since the external surface of belt 12 is in contact with the upper side of plastic sheet 4, it impresses this design upon the surface of the plastic sheet. It will be seen that the necessary pressure is provided by the canvas belt 6 together with drums 7 and 8. As best seen in FIG. 2, drum 7 can be adjusted by any suitable means, diagrammatically represented by screw 13, toward and away from roller 9, to thereby adjust the initial pressure and to some degree, the area of arcuate contact, during the period of contact of sheet 4 with belt 12; drum 8 can similarly be adjusted by means of screw 14 to control the pressure at the area of separation between the plastic mat 4 and belt 12. This adjustment is very important, and must be determined in each case by varying the setting of respective adjusting means 13 and 14 until the best results are secured. The plastic material of sheet 4 is, of course, quite hot as it leaves the die 4, and the major displacement of material on its surface to form the embossed design impressed by the outer surface of belt 12 is accomplished in the initial area of contact. Adjustment of drum 7 provides the correct pressure for this initial contact. Due to its extended surface, the belt 12 becomes quite cool during the time it is out of contact with the hot plastic material, and therefore tends to rapidly cool and set the embossed design on the upper surface of the plastic sheet 4, during the time the two surfaces are in contact. Drum 8 is not maintained in as close contact with drum 9 as is the initial drum 7, which enables the plastic mat 4 to be gradually separated from its contact with the surface of belt 12 along a line where it has cooled sufficiently to retain the impressions made upon its surface by belt 12. In practice, it is found that by proper adjustment of drum 8, a clean separation can be obtained with no material whatever remaining on the surface of belt 12 so that very long runs can be made without any necessity for stopping to clean the belt 12 which provides the embossing surface. However, the embossed surface of sheet 4 (the upper surface) is still quite warm and soft, and it is desirable to provide additional cooling means to set the embossed surface so that the plastic mat can be rolled up without deforming this surface. For this purpose, blower means 16 can be employed, or any other known type of colling means can be used. The plastic mat can be satisfactorily extruded at the rate of about four inches per second, depending somewhat on the size of the extruder, and in the case of polyvinyl chloride (Vinylite) it is preferably extruded at a temperature of 360° F.

The rubber belt 12 may, of course, have any suitable matrix impression on its surface for the production of any desired pattern on the surface of the plastic mat 4. However, one suitable form of rubber belt is that shown in FIGS. 4 and 5 of U.S. Patent No. 2,147,218, to Reimel, which may be made by the method described in that patent. Such a belt provides a woven textured surface on the upper side of plastic mat 4, which is a perfect replica of the woven surface shown in FIG. 2 of the Reimel patent. Such a surface has deep undercuts, which it would appear impossible to separate successfully from the surface of belt 12. However, due to the fact that the belt is made of rubber and is itself quite flexible, while the still warm plastic at the line of separation is still more soft and yielding, in practice, the two surfaces readily pull apart and no appreciable amount of plastic is left in the deep crevices of the belt surface 12. It will be noted that this result is obtained without the use of extra external heating, such as is commonly required by prior art plastic embossing methods, since advantage is taken of the initial temperature of the plastic material 4, together with the adjustment of roller 7, while the belt 12 provides its own cooling action and in conjunction with adjustment of roller 8, permits the separation at the correct point to obtain optimum results. Preferably, the belt surface is provided with a thin coating of Teflon or a similar non-sticking plastic material for good "release" of the matting from the belt.

Figure 3:
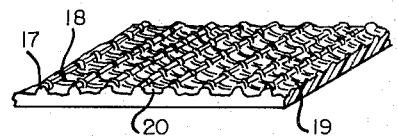
FIG. 3 is a sectional view of a portion of typical matting made according to the invention.

FIG. 3 is a sectional view through a piece of plastic matting made according to the invention when the above-described textile surface is produced. It will be noted that there are four different layers or levels of fabric represented at 17, 18, 19 and 20; the finished matting clearly shows each of these layers from the surface, giving an indication of the fineness and detail possible according to the invention. Correspondingly fine detail can, of course, be obtained with other patterns if desired, but the above example is given in order to show the excellent detail possible in practice with the invention.

It will be apparent that the embodiments shown are only exemplary and that various modifications can be made in construction and arrangement within the scope of my invention as defined in the appended claims.

I claim:

1. Apparatus for continuous molding of thermoplastic matting comprising means for extruding a sheet of thermoplastic material in a soft, warm condition; a continuous, flexible backing belt having a relatively uniform surface for receiving and carrying said sheet; first rotary transport means for said belt including two spaced, adjustable rollers; a flexible mold belt having on one surface thereof the matrix of a design to be molded on said sheet; and second rotary transport means for said mold belt, including a roller drum located between said two rollers so as to engage said backing belt through the sheet carried thereby over a substantial arcuate portion of the roller drum surface, and means for so adjusting the distance of at least one of said two spaced rollers from said roller drum as to vary the pressure and extent of arcuate contact between roller drum and said sheet.

2. The invention according to claim 1, said last means including means for independently adjusting the distance of each of said two rollers from the roller drum and from each other to vary the pressure and extent of arcuate contact between said roller drum and said sheet.

References Cited by the Examiner

UNITED STATES PATENTS

| | | | |
|---|---|---|---|
| 1,327,091 | 1/1920 | Egerton. | |
| 2,183,520 | 12/1939 | Van Derhoef | 18—10 X |
| 2,280,136 | 4/1942 | Webster et al. | 18—6 |
| 2,442,443 | 6/1948 | Swallow | 18—6 |
| 2,491,507 | 12/1949 | Lyon | 18—12 |
| 2,528,168 | 10/1950 | Paulsen | 18—6 X |
| 2,849,752 | 9/1958 | Leary | 18—10 |
| 3,107,394 | 10/1963 | Varon | 18—12 X |
| 3,121,912 | 2/1964 | Dieckmann | 18—6 |

J. SPENCER OVERHOLSER, *Primary Examiner.*